Figure 1:
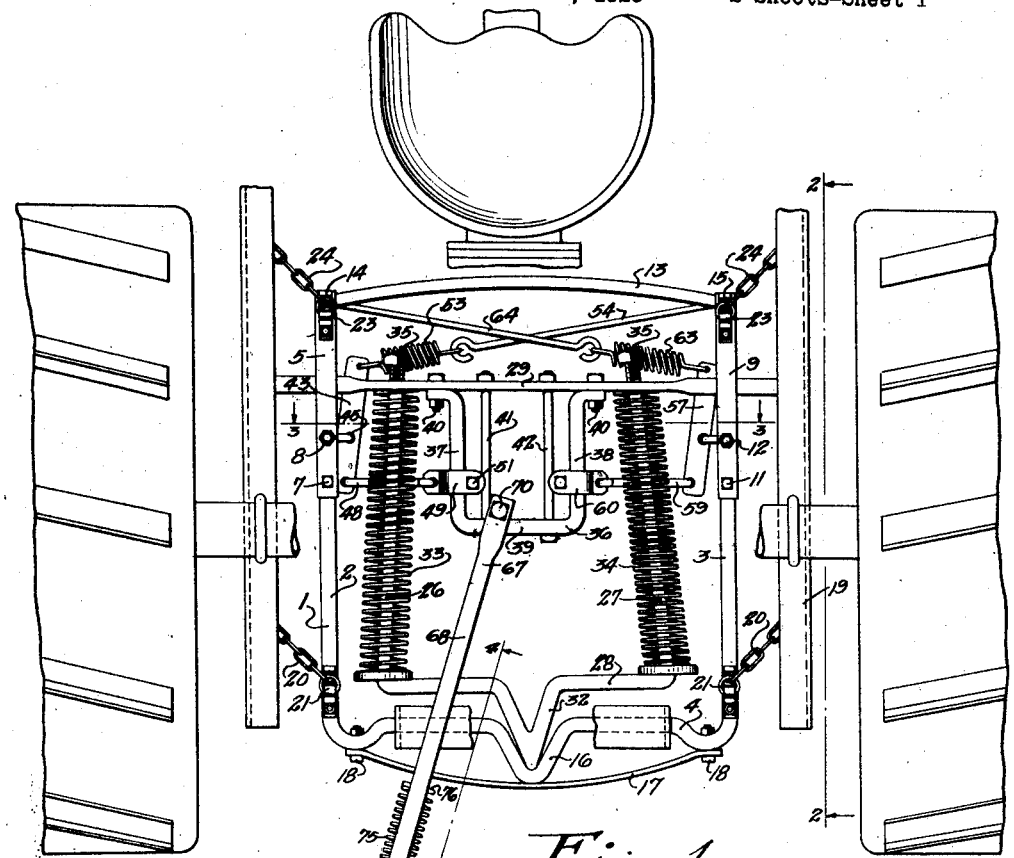

Oct. 12, 1926.

L. R. MILLER

DRAFT HITCH

Filed Nov. 16, 1925

1,602,585

2 Sheets-Sheet 1

INVENTOR.
LOUIS R. MILLER.

BY

ATTORNEYS.

Oct. 12, 1926.
L. R. MILLER
DRAFT HITCH
Filed Nov. 16, 1925    2 Sheets-Sheet 2
1,602,585
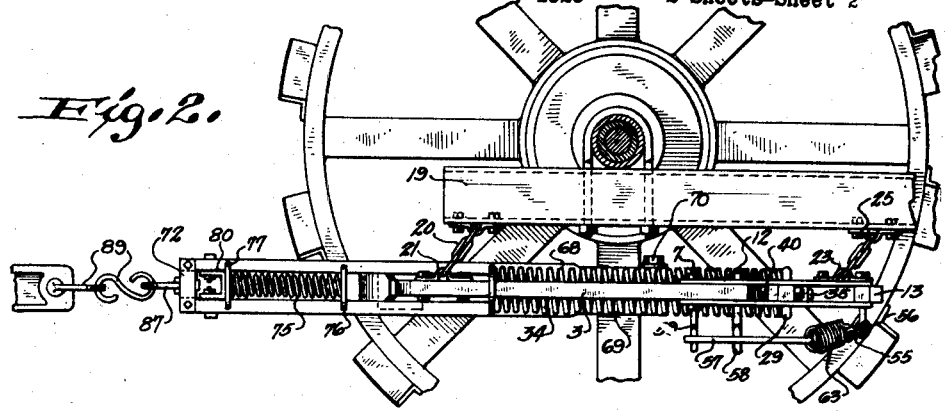
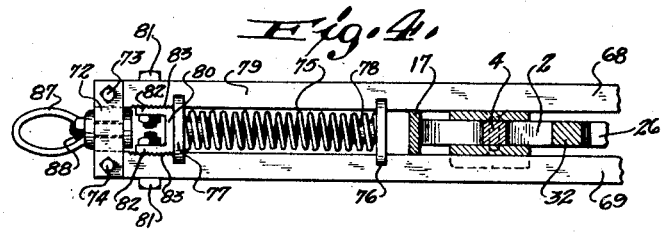
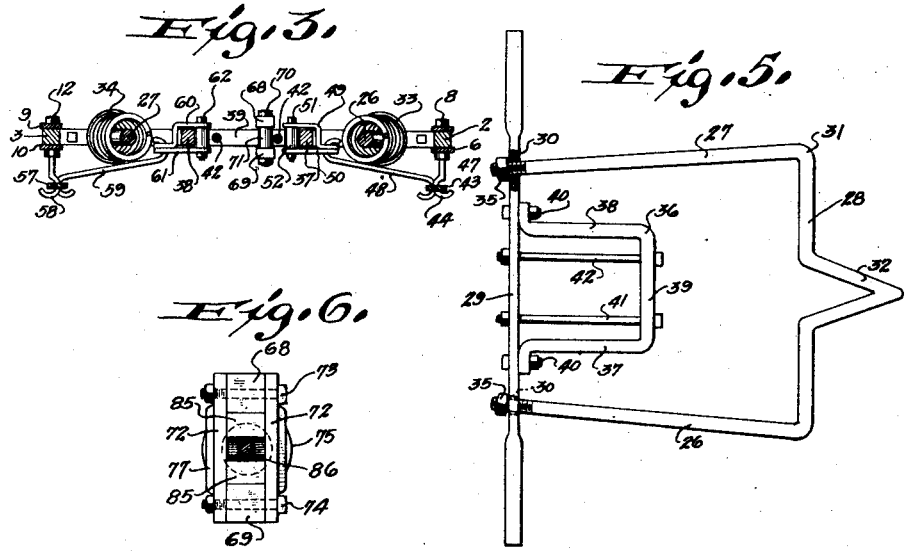
INVENTOR.
LOUIS R. MILLER.
BY
ATTORNEYS.

Patented Oct. 12, 1926.

1,602,585

UNITED STATES PATENT OFFICE.

LOUIS R. MILLER, OF NORWALK, WISCONSIN, ASSIGNOR OF ONE-HALF TO WILLIAM C. HORSTMEIER, OF MADISON, WISCONSIN.

DRAFT HITCH.

Application filed November 16, 1925. Serial No. 69,289.

This invention relates to improvements in draft hitches of the type more particularly adapted for connecting implements such as plows, harrows, scrapers and the like to a tractor.

In pulling an implement such as a plow or harrow by a tractor, the latter is generally offset an appreciable amount with respect to the implement so that the drawbar or draft hitch connecting the implement to the tractor is disposed at an appreciable angle to the longitudinal center line of the latter, which creates what is known as side draft, the action of the plow or implement in the furrow tending to pull the tractor laterally into alignment with itself. In draft hitches constructed heretofore, the parts of the latter arranged to take the strain caused by the side draft on the drawbar have been rigidly connected to each other so that there is no give when the plow or other implement strikes an obstacle. When this occurs, therefore, the impact of the plow or implement with the obstacle causes the tractor to slip laterally toward the furrow, and also places an additional and sudden load on the engine of the tractor.

One of the objects of the present invention, therefore, is to provide an improved draft hitch of the character referred to wherein the various parts are arranged and adapted to provide a resilient or yieldable connection between the drawbar and tractor frame to take the side draft and to thereby provide a cushion and reduce the shock on the tractor caused when the implement strikes an obstacle.

Another object is to provide an improved draft hitch of the character referred to which may be readily attached to a tractor, which is strong and simple in construction, and which may be manufactured at a comparatively small cost.

Other objects and advantages will hereinafter appear.

For the purpose of illustrating the invention an embodiment thereof is shown in the drawings, in which—

Figure 7:
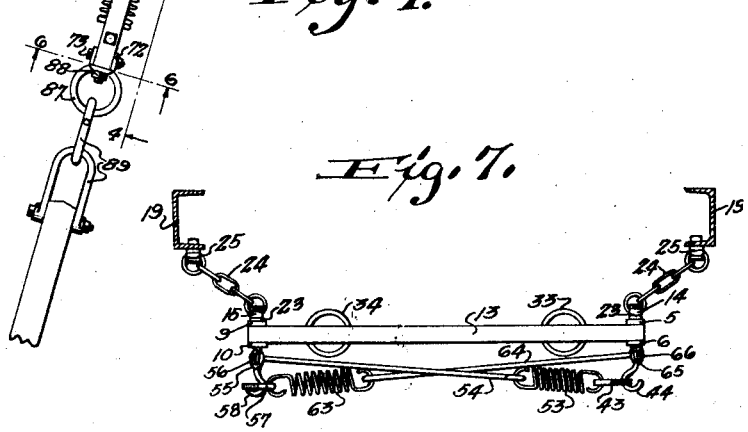

Figure 1 is a plan view, partly broken away, showing the improved draft hitch connecting a tractor to the draft bar of a plow or other implement;

Fig. 2 is a section on line 2—2 of Fig. 1;
Fig. 3 is a section on line 3—3 of Fig. 1;
Fig. 4 is an enlarged section on 4—4 of Fig. 1;
Fig. 5 is a plan view of one of the parts;
Fig. 6 is a section on line 6—6 of Fig. 1; and
Fig. 7 is an end elevation, looking toward the right in Fig. 2.

Referring more particularly to Fig. 1, the outer frame 1 of the device is rectangular in shape, and comprises a U-shape member made in one piece and having sides 2 and 3 and the end 4, straps 5 and 6 secured by means of bolts 7 and 8 to the end of member 2 and held in spaced relation by the latter for the purpose hereinafter explained, similar straps 9 and 10 secured by means of bolts 11 and 12 to the end of member 3 and held in spaced relation thereby, and a reinforcing end member 13 extending transversely of side members 2 and 3 and having its respective ends arranged between straps 5, 6, 9 and 10 and secured thereto by bolts 14 and 15. The central portion 16 of end 4 of the outer frame is bent outwardly, as shown, to provide a bearing for the inner member or frame hereinafter described. A strap 17 engages portion 16 of end 4 and is secured to the adjacent corners of frame 1 by bolts 18, the bolts passing through the ends of the strap, as shown. The outer frame 1 is suspended from the frame 19 of the tractor by a number of links 20 secured to suitable brackets 21 bolted or riveted to the rear corners of the frame and to similar brackets 22 secured to the tractor frame. The links 20 provide a direct connection between the draft hitch and tractor frame and sustain substantially the entire load or pull. Brackets 23 are bolted or riveted to the front corners of frame 1 and are connected by means of links 24 to similar brackets 25 which may be secured to the tractor frame, links 24 sustaining very little of the load or pull and acting mostly to suspend the front end of the device from the tractor for lateral play with respect thereto and to hold the device in substantially a horizontal plane, while permitting movement of the device out of this plane to allow for adjustment when the tractor and plow or other implement change their relative positions with respect to each other in a vertical direction in traveling over rough ground.

As more clearly shown in Figs. 1 and 5, the inner frame or member of the device is arranged within and centrally of the outer frame 1, and comprises a U-shape member having sides 26 and 27 and an end 28, a bar or member 29 extending transversely of frame 1 and across the ends of sides 26 and 27, bar 29 being provided with openings 30 through which the ends of sides 26 and 27 loosely pass, the respective ends of bar 29 extending outwardly beyond sides 26 and 27 and between straps 5, 6, 9 and 10 whereby the inner frame or member, designated generally by the reference numeral 31, is supported by the outer frame 1 for lateral play with respect thereto for the purpose hereinafter explained. The central portion 32 of end 28 is bent outwardly, as shown, to fit in the bearing provided by portion 16 of end 4 to permit this lateral play of frame 31 with respect to frame 1 and to provide a pivotal connection between these frames on substantially the longitudinal center lines thereof. Springs 33 and 34 are arranged upon sides 26 and 27 and are normally under no tension, nuts 35 being threaded upon the ends of sides 26 and 27 to hold bar 29 in assembled relation with respect thereto and against the adjacent ends of the springs. A U-shape member 36 having sides 37 and 38 and an end 39 is arranged centrally of bar 29, as shown in Figs. 1 and 5, and is secured thereto by bolts 40. Bolts 41 and 42 are arranged longitudinally of frame 31 and extend through end 39 of the U-shape member 36 and bar 29, for the purpose hereinafter explained, these bolts acting also to secure member 36 to bar 29. A lever 43 is pivotally connected at a point one side of its center to side 2 of the outer frame 1, the lower end 44 of bolt 8 being shaped to provide a hook and extending through an opening 45 in lever 43, nuts 46 and 47 being threaded upon bolt 8 to hold the same securely in position and against pivotal movement, and to also act to secure straps 5 and 6 to side 2. The short arm of lever 43 is connected by means of a suitable link 48 to the adjacent ends of the complementary parts 49 and 50 fitted loosely about side 37 of U-shape member 36, the opposite ends of parts 49 and 50 being connected by a bolt 51. A roller 52 is loosely fitted upon bolt 51 and arranged between parts 49 and 50 to provide a rolling contact with side 37 to permit the latter to slide freely through parts 49 and 50 for the purpose hereinafter explained. A spring 53 is connected at one end thereof to the long arm of lever 43, and is connected at its other end by means of a rod 54 to the opposite front corner of outer frame 1, the end 55 of bolt 15 being shaped to receive the adjacent end of rod 54 upon which nut 56 is threaded. A similar lever 57 is pivotally connected at a point one side of its center by means of the lower hooked end 58 of bolt 12 to side 3 of outer frame 1, the short arm of lever 57 being connected by means of a link 59 to complementary parts 60 and 61 which are similar to parts 49 and 50 and are fitted about side 38 of the U-shape member 46, a roller 62 engaging side 38 to act with roller 52 to permit free sliding movement of bar 29 and member 36 secured thereto with respect to parts 49, 50, 60 and 61. A spring 63 is connected at one end thereof to the long arm of lever 57 and at the other end thereof to the opposite front corner of frame 1 by means of rod 64 having its end extending through the lower curved end 65 of bolt 14 and held in position by nut 66. The nuts 56 and 66 are adjusted so as to take up all loose play between levers 43 and 57 and the various parts connecting the respective ends of these levers to the inner and outer frames 1 and 31, nuts 56 and 66, however, not being adjusted or tightened sufficiently to place springs 53 and 63 under any initial tension.

The drawbar 67 comprises upper and lower bars 68 and 69 and is pivotally connected to the inner frame or member 31 on substantially the longitudinal center line thereof by means of a bolt 70 extending through adjacent ends of members 68 and 69 and carrying a roller 71 arranged between the latter and engaging end 39 of U-shape member 36. The opposite ends of members 68 and 69 are secured together by means of straps 72 and bolts 73 and 74. A spring 75 is arranged between members 68 and 69 and held in position by means of plates 76 and 77 having their respective ends bifurcated to loosely receive members 68 and 69, as more clearly shown in Figs. 1 and 4, and provided with bosses 78 and 79 extending into opposite ends of the spring. A U-shape member or stop 80 is arranged between members 68 and 69 and adjustably secured thereto by means of bolts 81 extending through slots 82 in the ends of member 80, the engaging faces of members 68, 69 and 80 being provided with interlocking recesses or notches 83 whereby member 80 is held securely in adjusted position when bolts 81 are tightened. Member 80 is adjusted so that there is normally a slight play of spring 75 and plates 76 and 77 between strap 17 and member 80, strap 17 being curved on the arc of a circle about bolt 70 when the latter is in position on the longitudinal center line of frame 31.

For the purpose of connecting drawbar 67 to the draft bar 74 of the plow or other implement, blocks 85 may be arranged between straps 72 and spaced to loosely receive a bolt 86, as shown in Fig. 6, upon which a ring 87 is loosely fitted and held in position by nut 88, ring 87 thereby providing a swivel connection and being connected to the draft bar 84 by any suitable means such as links 89.

The operation of the improved draft hitch is as follows: Assuming that the parts are in their respective positions as shown in Fig. 1, with the tractor offset to the right of the furrow and the longitudinal center line of the plow or implement in the latter, it will be obvious that when the tractor moves forward the pull thereof will be transmitted to the draft bar 84 of the plow through drawbar 67, bar 29, springs 33 and 34, and the engaging end portions 16 and 32 of the outer and inner frames 1 and 31, respectively, roller 71 of the drawbar acting against bolt 41 and end 39 of U-shape member 36 to pull bar 29 toward end 28 of inner frame 31, this being permitted by the loose fit of the ends of sides 26 and 27 in openings 30 in bar 29 as well as the loose fit or play between the ends of the latter and straps 5, 6, 9 and 10, as explained above. It will be obvious that when drawbar 67 is in the position thereof shown in Fig. 1 to the left of the longitudinal center line of the tractor, that the pull or force acting on the drawbar will have a component acting to the right against bolt 41, this component being the side draft. Link 59 will, therefore, be placed in tension an amount equal to this component or side draft and will tend to swing or move lever 57 in a clockwise direction about bolt 12 as a center, this action placing spring 63 and rod 64 under tension an amount equal substantially to one-half the tension in link 59, assuming that the short arm of lever 57 is substantially one-half the long arm thereof. If the plow or other implement should strike an obstacle, it will be obvious that the pull on drawbar 67 will suddenly increase and the component thereof or side draft acting against bolt 41 will increase accordingly. Spring 63 will thereby be placed under greater tension and will give and absorb the shock caused by this additional side draft. It will thus be seen that the side draft on the tractor is taken up by the spring 63, so that the tractor is less likely to slip laterally or to be pulled toward the furrow. The springs 33 and 34 provide a cushion to absorb the shocks or force set up and acting longitudinally of the tractor and plow when the latter strikes an obstacle. The pivotal connection between the outer and inner frames provided by portions 16 and 32 thereof permits lateral play of the inner frame with respect to the outer frame, this play being limited in one direction by spring 63. The effectiveness of spring 63 is increased by connecting the same to the long arm of lever 57.

When the plow or other implement is offset on the other side of the longitudinal center line of the tractor so that the drawbar 67 swings over to the right of this line and roller 71 acts against bolt 42, inner frame 31 will shift sligthly to the right with respect to outer frame 1 and spring 53 will be placed under tension in the same manner and for the same purpose as spring 63 to absorb the shock or side draft. The action of spring 53 and the parts associated therewith is the same as the action of spring 63 and its associated parts explained above. When spring 53 is acting, spring 63 is under no tension, while when spring 63 is acting, spring 53 becomes ineffective. In backing up, spring 75 will be compressed between strap 17 and member 80, the push from the tractor to the plow being directly transmitted thereto through links 20, the end 4 of outer frame 1, strap 17 and spring 75.

Upper and lower plates 90 and 91 may be secured to end 4 of outer frame 1 by means of rivets 92 and arranged to support the adjacent end of frame 31 and to hold portion 32 thereof in pivotal engagement with portion 16 of outer frame 1. The ends 93 of the lower plate 91 may be bent downwardly to provide stops arranged to engage member 69 of drawbar 67 to limit swinging movement thereof about bolt 70 as a center to prevent the drawbar from swinging over far enough in either direction to engage the moving parts of the tractor.

From the foregoing it will be seen that an improved draft hitch has been provided wherein the side draft upon the tractor is taken up through the resilient means or springs 53 and 63, and that the latter provide a cushion to absorb the shock in a direction transverse to the tractor caused by engagement of the plow or other implement with an obstacle, thereby reducing the tendency of the plow to slip laterally toward the furrow. It will further be seen that an improved draft hitch has been provided wherein springs act to transmit the pull between the tractor and plow in both longitudinal and lateral directions, and that the improved draft hitch may be readily attached to a plow and has advantages over those constructed heretofore as regards flexibility of operation.

For the purpose of illustrating the invention one embodiment thereof has been shown and described, but of course it will be apparent to those skilled in the art that various changes in the size, shape and arrangement of the parts may be adopted without departing from the spirit of the invention or the scope of the claims.

The invention claimed is:

1. A draft hitch of the character described comprising an outer frame, a second frame arranged within said outer frame and engaging the latter at one end of the same, a draw bar pivotally connected to said inner frame, and means connecting said frames together and arranged to permit lateral play of the same with respect to each other.

2. In a draft hitch of the character described, an outer frame, a second frame fitted within said outer frame and supported by the latter for lateral play with respect thereto, said second frame being arranged centrally with respect to said outer frame and engaging the latter on substantially the longitudinal center line thereof, a draw bar pivotally connected to said second frame on substantially the longitudinal center line thereof and extending outwardly beyond the engaging portions of said frames, and means connecting each side of said second frame with both sides of said outer frame and arranged to permit said lateral play of said frames with respect to each other.

3. A draft hitch of the character described comprising a frame, a draw bar, a second frame engaging said first-mentioned frame on substantially the longitudinal center line thereof and providing a driving connection between the same and said draw bar, said second frame being shiftable laterally with respect to said first-named frame, and means for yieldingly holding said second frame against such lateral shifting.

4. In a draft hitch of the character described, an outer frame, a U-shape frame arranged within said outer frame and comprising side members and an end member engaging one end of said outer frame on substantially the longitudinal center line thereof, a bar extending across the free ends of said side members and adapted for longitudinal movement with respect thereto, the ends of said bar extending beyond said side members and engaging with said outer frame to hold said frames in assembled relation with respect to each other and to permit lateral play of said U-shape frame with respect to said outer frame, means connecting each of said side members to both sides of said outer frame and permitting said play of said U-shape frame with respect to the latter, a draw bar pivotally connected to said first-mentioned bar on substantially the longitudinal center line of said U-shape frame and extending outwardly beyond the engaging ends of said frames, and springs arranged on said side members whereby a load on the draw bar is transmitted to said outer frame through said springs.

5. A draft hitch of the character described comprising a frame, a member arranged within said frame and supported thereby for lateral play with respect to the same, one end of said member engaging the adjacent end of said outer frame on substantially the longitudinally center line thereof, a draw bar pivotally connected to said member and extending outwardly in the direction of the engaging ends of said frame and said member and beyond the same, and means connecting said frame to said member for limiting lateral play of the latter with respect to said frame.

6. A draft hitch of the character described comprising a frame, a member arranged within said frame and supported thereby for lateral play with respect to the same, one end of said member engaging the adjacent end of said outer frame on substantially the longitudinal center line thereof, a draw bar pivotally connected to said member and extending outwardly in the direction of the engaging ends of said frame and said member and beyond the same, and spring means connecting said frame to said member for limiting lateral play of the latter with respect to said frame.

7. A draft hitch of the character described comprising a frame, a member arranged within said frame and supported thereby for lateral play with respect to the same, one end of said member engaging the adjacent end of said outer frame on substantially the longitudinal center line thereof, a draw bar pivotally connected to said member and extending outwardly in the direction of the engaging ends of said frame and said member and beyond the same, levers pivotally connected to the sides of said frame, and resilient connections between the respective ends of said levers and said frame and said member arranged to limit said play of the latter with respect to said frame.

8. In a draft hitch of the character described, a frame, a member arranged transversely of said frame and supported thereby for lateral and longitudinal movement with respect thereto, springs arranged between said member and one end of said frame, means associated with said springs for holding the same in position and engaging said end of said frame, and a draw bar pivotally connected to said member at a point substantially on the longitudinal center line of said frame and extending outwardly beyond said end of said frame.

9. A draft hitch of the character described comprising an outer frame, a member arranged within said frame substantially centrally thereof and supported thereby for longitudinal and lateral movement with respect thereto, a draw bar pivotally connected to said member at a point substantially on the longitudinal center line of said frame and extending outwardly beyond one end thereof, spring means interposed between said member and said end of said frame and adapted to transmit to the latter the load on said draw bar, and other spring means connecting said member to the sides of said frame and arranged to limit said lateral movement of said member with respect to said frame.

10. The combination with a tractor having a frame, of a draft hitch arranged centrally of said tractor, said draft hitch including an outer frame suspended from said said tractor frame, a member arranged within said outer frame and supported thereby for lateral and longitudinal play with respect thereto, a draw bar pivotally connected to said member on substantially the longitudinal center line of said hitch, and resilient means connecting said member to said outer frame for permitting and limiting said play of the same with respect to each other, said resilient means being arranged to transmit the entire load on said draw bar to said tractor frame.

11. A draft hitch of the character described comprising an outer frame, a member arranged within said frame and supported thereby for lateral play with respect thereto, a draw bar connected to said member and extending outwardly beyond said frame, and means connecting said member to said frame and arranged to permit said play of the same with respect to each other, said means including crossed elements having their respective ends connected to opposite sides of said frame.

12. In a draft hitch of the character described, pair of frames arranged one within the other and for lateral play with respect to each other, an end of one of said frames having a pivotal connection with the adjacent end of the other frame, a draw bar connected to one of said frames, and resilient means connecting the other adjacent ends of said frames and arranged to permit and limit said play of the latter with respect to each other.

In witness whereof I hereto affix my signature.

LOUIS R. MILLER.